US011810061B2

(12) United States Patent
Lam et al.

(10) Patent No.: US 11,810,061 B2
(45) Date of Patent: Nov. 7, 2023

(54) PRE-TRIP INSPECTION PREDICTION AND PTI REDUCTION SYSTEMS, PROCESSES AND METHODS OF USE

(71) Applicant: OOCL (infotech) Holdings Limited, Hong Kong (HK)

(72) Inventors: Po Ching Lam, Hong Kong (HK); Wai Kwan Chow, Hong Kong (HK); Jiao Peng, Guangdong (CN)

(73) Assignee: OOCL (Infotech) Holdings Limited, Hong Kong (HK)

( * ) Notice: Subject to any disclaimer, the term of this patent is extended or adjusted under 35 U.S.C. 154(b) by 0 days.

(21) Appl. No.: 17/742,046

(22) Filed: May 11, 2022

(65) Prior Publication Data

US 2022/0270041 A1 Aug. 25, 2022

Related U.S. Application Data

(63) Continuation of application No. PCT/US2020/061008, filed on Nov. 18, 2020.

(60) Provisional application No. 62/937,115, filed on Nov. 18, 2019.

(51) Int. Cl.
*G06Q 10/083* (2023.01)
*G06N 20/00* (2019.01)
*G06Q 10/0833* (2023.01)
*G06Q 10/04* (2023.01)
*G06Q 10/067* (2023.01)

(52) U.S. Cl.
CPC ......... *G06Q 10/0838* (2013.01); *G06N 20/00* (2019.01); *G06Q 10/04* (2013.01); *G06Q 10/067* (2013.01); *G06Q 10/0833* (2013.01)

(58) Field of Classification Search
CPC .. G06Q 10/0838; G06Q 10/04; G06Q 10/067; G06Q 10/0833; G06N 20/00
USPC ........................................................ 705/341
See application file for complete search history.

(56) References Cited

U.S. PATENT DOCUMENTS

| | | | |
|---|---|---|---|
| 2015/0177094 A1* | 6/2015 | Friedlander | G01N 29/04 73/29.01 |
| 2016/0131605 A1* | 5/2016 | Hamrouni | G01N 25/18 702/183 |
| 2018/0347895 A1* | 12/2018 | Jonsson | F25D 29/003 |

OTHER PUBLICATIONS

"Use of RFID for Intelligent Pre-shipment Inspection" Published by Computer Science and Engineering Department, Shanghai Jiao Tong University (Year: 2010).*

(Continued)

*Primary Examiner* — Zeina Elchanti
(74) *Attorney, Agent, or Firm* — Foley & Lardner LLP

(57) ABSTRACT

Described herein are systems and processes for producing a pre-trip inspection (PTI) prediction for a cargo container. The PTI prediction makes use of real time data from a container, and historical data from the same container. In some embodiments a system includes at least one container having a sensor, a processor and a database, where the processor may use software to correlate sensor data with stored information from the database to produce a forecast of whether the container will require maintenance at its next entry to a geofence area. In some embodiments the system may have a communication device for transmitting data or instructions to a remote computer for processing.
Methods of correlating sensor information and data base information are also described.

13 Claims, 17 Drawing Sheets

(56) References Cited

OTHER PUBLICATIONS

International Search Report and Written Opinion for PCT Appl. No. PCT/US2020/061008, dated Feb. 9, 2021.

* cited by examiner

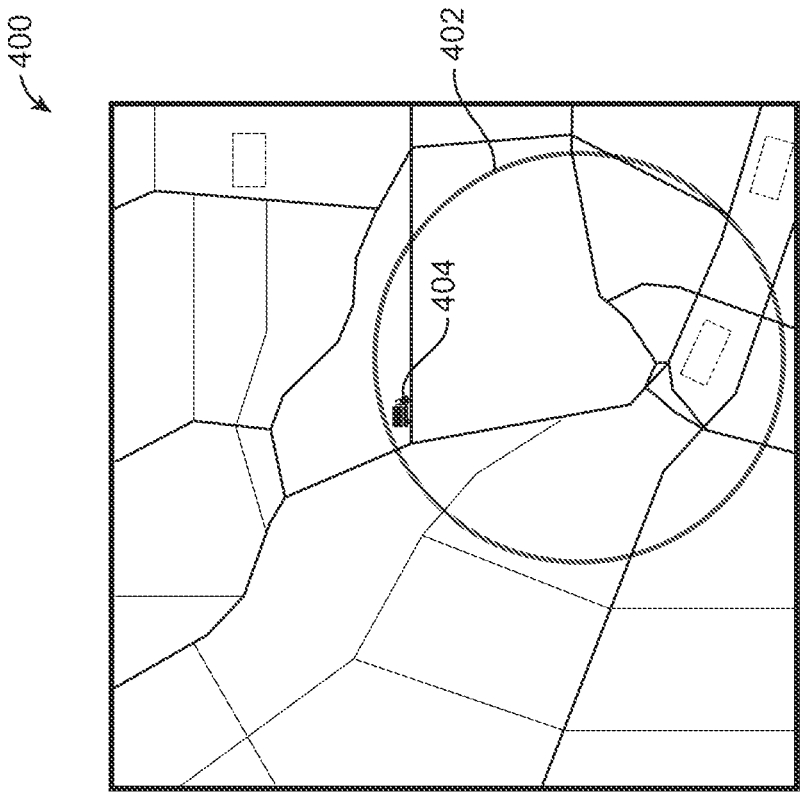
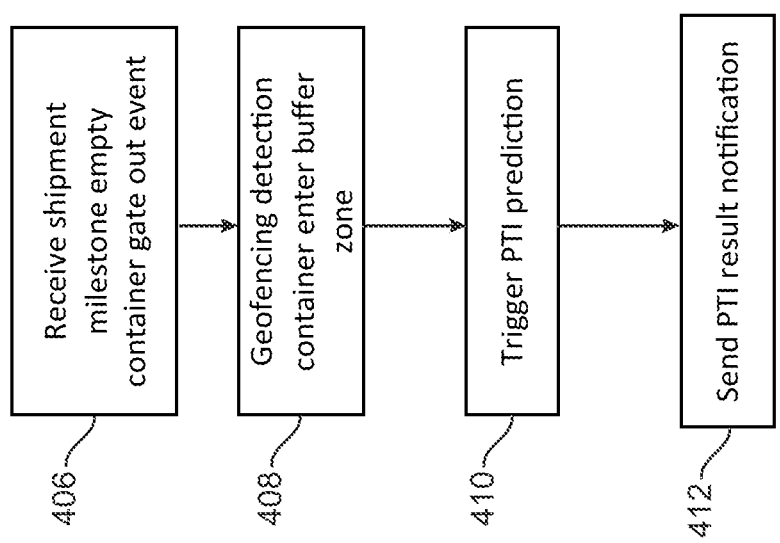
FIG. 4

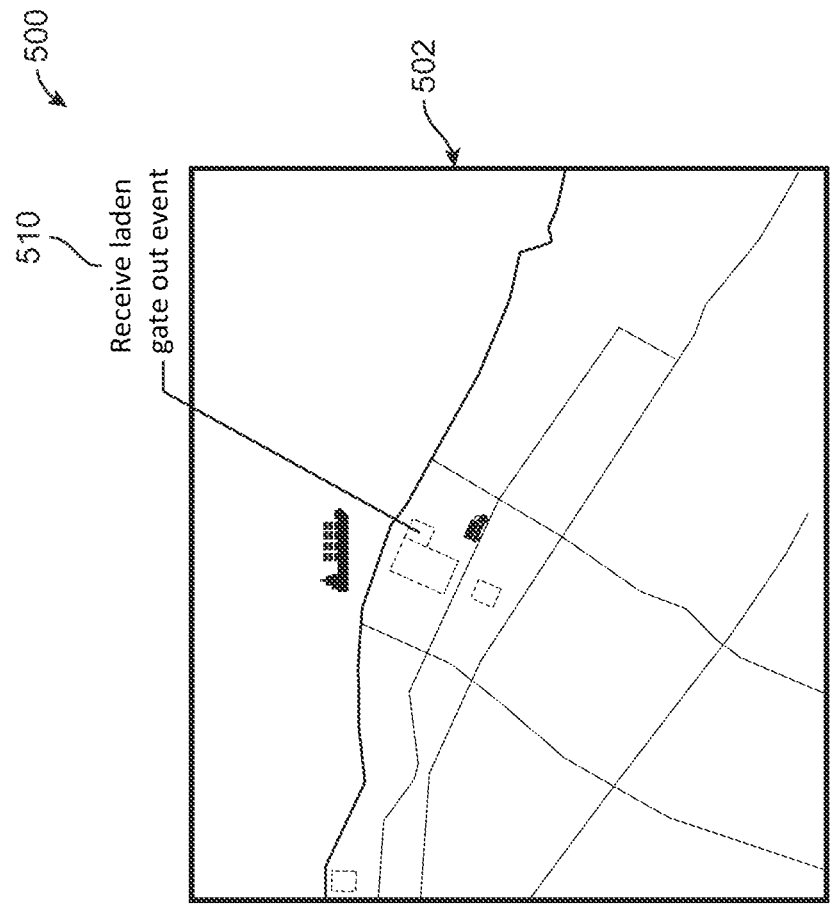
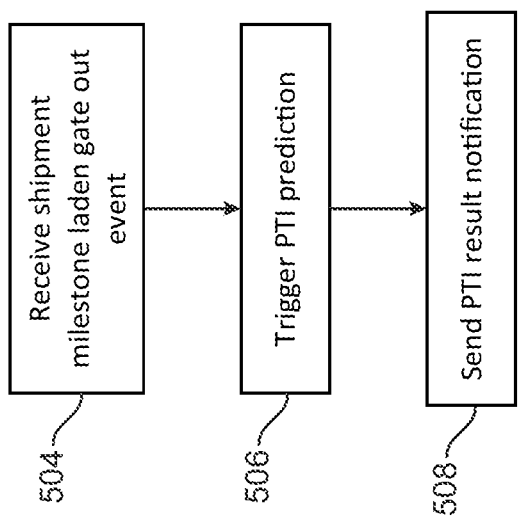
FIG. 5

| Depot App | PTI Feedback ▼ | | | | ⊙ TAO19 | Logout |
|---|---|---|---|---|---|---|
| PTI Instruction | | | | | | |
| Container Number | | | Last Updated Time | 23 Jul 2019 ~ 21 Oct 2019 | Feedback | All ◆ Search |
| Container No. | Last Booking No. | Instruction | Last Updated at (GMT+8) | Fault Code | Empty Return (GMT+8) | Feedback (Reason for PTI) |
| OERU4065776 | 7205568790 | Skip PTI | 2019-10-18T01:34:17+08:00 | Detail | 2019-10-18T00:36:00+08:00 | ☑ Add Feedback |
| CXRU4025486 | 7205568190 | Skip PTI | 2019-10-17T15:58:17+08:00 | Detail | 2019-10-17T14:25:00+08:00 | ☑ Add Feedback |
| OERU4063795 | 7045568660 | Skip PTI | 2019-10-16T22:36:29+08:00 | Detail | 2019-10-16T21:57:00+08:00 | ☑ Add Feedback |
| SEGU4067605 | 7044753660 | Skip PTI | 2019-10-16T12:34:25+08:00 | Detail | 2019-10-16T11:49:00+08:00 | ☑ Add Feedback |
| DFOU4068870 | 7044766400 | Skip PTI | 2019-10-16T12:34:24+08:00 | Detail | 2019-10-16T11:30:00+08:00 | ☑ Add Feedback |
| SZLU4062837 | 6212766330 | Skip PTI | 2019-10-15T20:35:23+08:00 | Detail | 2019-10-15T20:09:00+08:00 | ☑ Add Feedback |

FIG. 16

PRE-TRIP INSPECTION PREDICTION AND PTI REDUCTION SYSTEMS, PROCESSES AND METHODS OF USE

CROSS-REFERENCE TO RELATED APPLICATIONS

The present application is a continuation application of PCT/US2020/061008 filed Nov. 18, 2020, which claims priority to priority from U.S. 62/937,115, entitled "Pre-Trip Inspection Prediction and PTI Reduction systems, processes and methods of use," filed Nov. 18, 2019, the contents of which are herein incorporated by reference in their entireties.

BACKGROUND

Field

This disclosure relates to systems and methods used to perform pre-trip inspection (PTI) on intermodal containers.

Background

Intermodal containers are used globally to transport cargo in uniform containers. These containers come in short and long standardized lengths. The containers can be stacked, and separated to be placed on trucks, rail cars and cargo vessels. The containers may travel a few miles, or thousands of miles as they are used to move cargo.

The usefulness of these containers depends a great deal on their structural integrity. Each container should be sound, and without holes or damage that could compromise the cargo to be placed within it. Other containers create special environments inside the container. These are generally referred to as "reefers," or refrigerated containers. The transportation of food stuffs, medical and pharmaceutical supplies, and many other goods may require refrigeration, or some kind of special environment. Reefers may be partitioned, so a single container may have 2 or more micro environments inside. Intermodal containers and reefers generally require some sort of pre-trip inspection (PTI) to make sure the refrigeration unit, and any other hardware or software on the container, is working properly, and can be depended on for the next cargo transit.

Modern containers may have a control panel that is connected to a series of sensors for monitoring a refrigeration unit. The control panel may be accessed by a user and checked manually. These panels require a start-up procedure, and a manual check through various sensors and systems connected to the control panel. The operation may take 20-30 minutes for each container. If the inspection reports that there is something wrong with the container (showing an error code), the user should seek the help of a maintenance crew. Maintenance to track down the problem causing the error requires manual inspection.

Manual inspection of regular containers and reefers can be labor intensive. Inspecting a container can take hours. A reefer may require a software technician to perform a software diagnostic. A hardware engineer may have to run tests on the electronics associated with the container to ensure the unit can operate within its normal specifications (like a max cold draw, or circulation of air at a particular velocity). Another person may do a visual inspection of the container, looking for holes, cracks or other physical problems. The process of performing a Pre-Trip Inspection may take several hours. If the container does require adjustment or repair, the time and money costs may increase. The cost in people hours and the delay in getting each container approved and on to its next cargo pick up adds up to hundreds of millions of dollars a year. A variety of solutions have so far been proposed to reduce the labor and cost burden of shippers to performing PTI. These solutions generally involve using the control panel on the container to run diagnostics and analyze data in response to a user's manual prompt. The analysis is limited to the programing in the control panel. The analysis may include cargo information, but often the analysis simply determines if the component systems of the container are running within normal limits.

While these and other methods of performing PTI are useful, there remains a need in the industry for being able to produce a forecast or prediction of a containers ability to pass a PTI evaluation, without the trouble of conducting one manually. There is also a need for a method to evaluate a container for repair requirements without a manual inspection. As described herein, the use of the word "container" means any intermodal container for cargo, including reefers (refrigerated intermodal containers, special environment containers, and containers having any form of environmental control, environmental sensor, or security system).

BRIEF SUMMARY

Described herein are a system and processes for generating a pre-trip inspection prediction report. Intermodal containers should be of sufficient integrity and functionality to carry cargo from one destination to another. Each time a container carries a load of cargo, it completes a booking. The process for certifying a container may be fit for the next booking might be labor and time intensive. An automated system for determining whether a container may need maintenance may save labor and money.

In some embodiments, there is a method of producing a pre-trip inspection prediction for a container using a computer. The method comprises evaluating at least one historical data point related to a completed shipment for the container; analyzing an active data point from the container during an active shipment; predicting a likelihood of the container being suitable for a future shipment, according to the evaluation of the at least one historical data point and the analysis of the active data point; and producing the pre-trip inspection prediction, using the predicted likelihood of the container being suitable for a future shipment.

In some embodiments, the at least one historical data point may further include a plurality of data elements from one or more completed shipments. In some embodiments, the active data point may be received from the container while the container is in use. In some embodiments, the active data point may be evaluated through an event process. In some embodiments, the one or more historical data point(s) may further include at least one pre-trip inspection result. In some embodiments, the historical data point and the active data point may be from the same container. In some embodiments, the active data point and the pre-trip inspection prediction may be added to a database of historical data points. In some embodiments, the active data and the pre-trip inspection prediction may be continuously updated whenever a new active data point is received by the computer.

In some embodiments, there may also be a method of modeling suitability of an intermodal container for use. The method comprises accessing, from a database, a training data sample, the training data sample may represent a preferred operating state for the intermodal container; assimilating, by a machine learning tool, the training data sample to produce a model parameter for a model, the model parameter defining an acceptable range of data; analyzing, via the model, a live data sample against the model parameter; and predicting, via the model, the suitability of the intermodal container for use, according to whether the live data sample is within the acceptable range of data.

In some embodiments, the training data sample may further include a historical record of a previously recorded live data sample, and a historical record of a previously recorded pre-trip inspection prediction result. In some embodiments, the intermodal container may be a connected container. In some embodiments, the training data sample may be resident on an electronic device attached to the intermodal container. In some embodiments, the training data sample may be accessible via a cloud connection.

In some embodiments, there may be a system for generating Pre-Trip Inspection (PTI) predictions, the system comprises a communication device on an intermodal container, the communication device being in electronic communication with a plurality of sensors, the sensors providing data to the communication device; a database storing an intermodal container history information, the intermodal container history information including data from one or more past bookings for the intermodal container, the intermodal container history information containing internal and external data related to the intermodal container; an artificial intelligence engine operating a computer implemented program for analyzing data provided by the communication device, the computer implemented program drawing data from the database and the communication device, and weighting the data according to a calculation model; and a calculation model based on data from the database and the communication device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a gate in event 400 in accordance with an embodiment.

FIG. 5 illustrates a gate out event 500 in accordance with an embodiment.

FIG. 16 illustrates a screen shot of a user interface 1600 in accordance with an embodiment.

DETAILED DESCRIPTION

Figure 1:
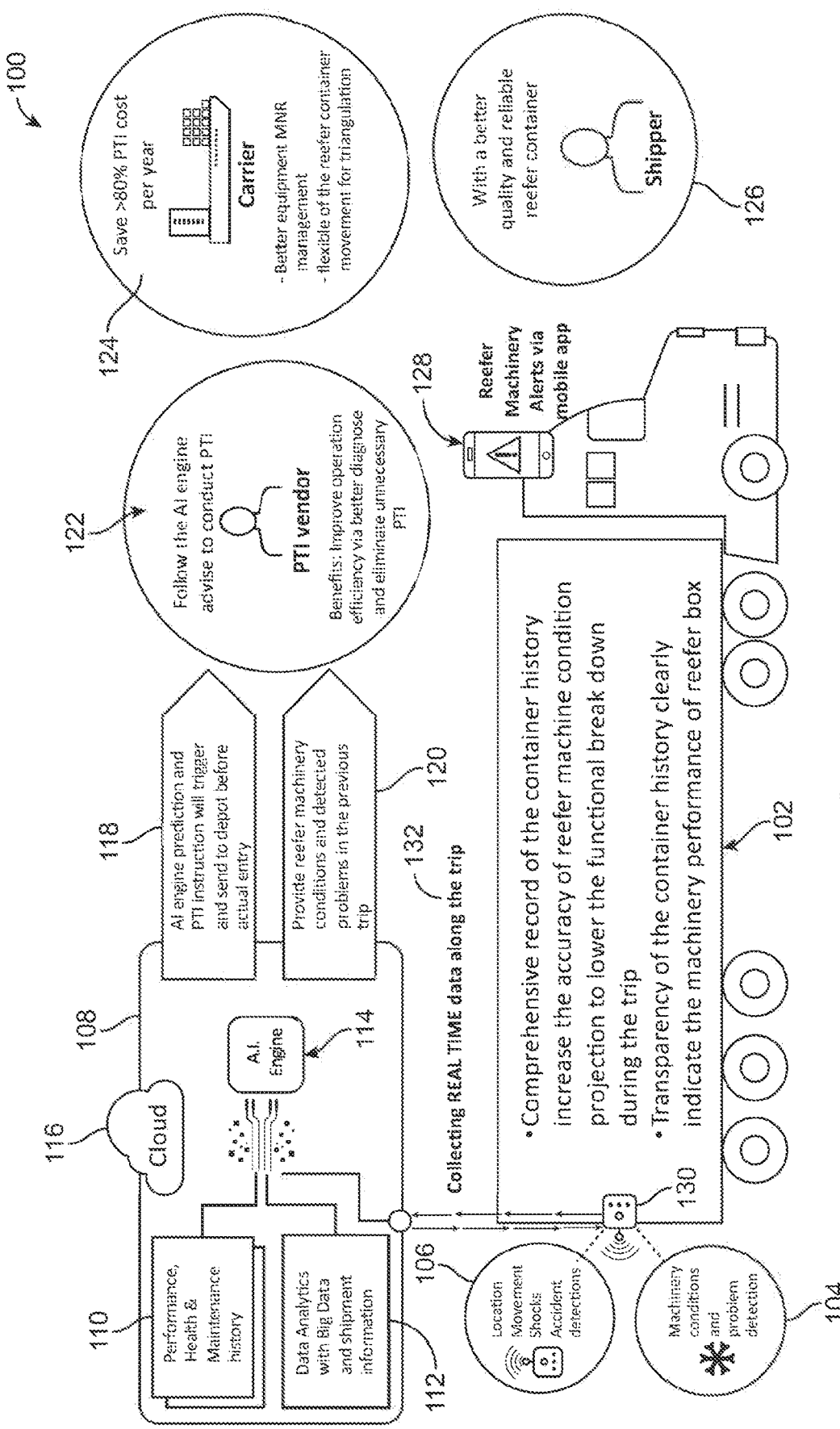
FIG. 1 illustrates an overview 100 in accordance with an embodiment.

In some embodiments, data collected from reefers may be stored in a database that tracks information related to a particular reefer or container (as used herein, "container" and "reefer" are used interchangeably). In this way, a "life-long" history of the container may be available to a system for analyzing the data from the container, or any window of time during the life of that container. The data collected from a container may include data on the electrical systems, the environmental control systems, the security monitoring systems, the position location systems, the external environment data, the geofence data and any other data gathered or produced from any sensor or electronic device in, on or around the container.

In some embodiments, connected containers may leverage advanced technologies, including artificial intelligence, and the internet of things (IoT), to provide real time container monitoring and predictive visibility. The sensors on a container may be connected to a sensor controller or monitor. The monitor may be wirelessly connected to the cloud, or to a local wireless controller. In some embodiments, these monitors may be accessed with a portable device (wired). The container sensors may capture a wide variety of information, such as temperature, humidity, location, impact, environment, motion and shocks to name a few. The information is converted into machine readable data. The data may be used in combination with artificial intelligence (AI), computer learning and a variety of analytic tools to produce reliable real time updates.

In some embodiments, the system described herein may handle over a million incoming messages every day. In other embodiments, the volume may exceed 1.5 million incoming messages a day. In some embodiments the volume may exceed 2 million incoming messages a day. Data may be collected, encrypted, consolidated and analyzed to provide predictions and actionable insights using artificial intelligence and other machine tools (e.g., machine learning tools). Through various applications and APIs (Application Programming Interface), these solutions may support many business operations including customer service, transportation and product compliance, strategic planning and maintenance and repairs.

These services may be available through existing networks which may expand the reach globally among hundreds of countries and thousands of city pairs (two cities where transport vessels routinely go between as a single trade route). The combination of technologies may be used to create a connected container. The connected container may have various internal sensors to measure the environment inside the container, system sensors to monitor a wide variety of operation and states of the electronic or mechanical systems of the container, and external sensors for reading external factors such as weather conditions, movement, geofence location or any other parameter desired. The connected container allows for proactive identification and may help determine whether a container is experiencing a normal event or an unexpected disruption. The data analysis may take into account the shipping history and/or the commodity characteristics to accurately provide smart alerts to customers, vendors and users.

In some embodiments, a software application running on a computer may retrieve the date from various inputs, process the data and analyze the data based on one or more logic rules, and one or more prediction models. The software application may then produce a PTI report. In some embodiments, a user interface (UI) may present integrated shipment information with real time IoT data for end-to-end shipments. The UI may enable visualization through maps, graphs and data reports which may provide more predictive door ETAs. The connected container may intelligently project the latest ETA through machine learning based on real time current locations, historical patterns, traffic conditions, road regulations as well as data inputs from the container sensors. The connected container may provide data about the container, and the system can correlate local and national data with the location of the container to real world occurrences of container delays or troubles.

A non-limiting overview of the system and processes of the present disclosure are now shown in FIG. 1. A container 102 may be transported by truck, rail, ship, plane or other vehicle. The container 102 may have one or more of a communication device 130. The system makes use of one or more sensors that collect the container 102 internal data 104, and external data 106. The internal and external data may be collected by a single device, or two or more devices. The collected data may be transmitted to an AI engine 114 using real time data collection 132 methods, or near real time data collection methods. In this manner, data may be collected on a continual basis, or near continual basis, so the PTI analysis (or any other analysis) may be performed in real time, or near real time, as well. The benefit of the real time monitoring and analysis allows the system to evaluate any trigger data which may cause the condition of the container 102 to be automatically listed as needing a manual PTI evaluation, a repair or replacement. The real time data collection 132 may be hampered by the communication device 130 ability to communicate with the cloud, however various communication relays may help alleviate this problem. As used herein, the reference to "real time" or "near real time" is associated with the time data is transmitted to the AI engine, as a container 102 may have a clock cycle of periodic or intermittent transmission in order to save battery life, match signal cycles of other networks, or other real world constraints on the ability of the container 102 for transmission. Thus "real time/near real time" may not mean continuous transmission, reception or processing.

The internal data 104 may include a large number of data elements as described herein. The external data 106 may include, as non-limiting examples, the location of the container 102, the movement of the container 102, any abnormal physical shocks (such as being dropped, suffering a collision), unexpected movement (stolen, or washed over the side of a container ship), and/or penetrations of loss of the container integrity (which may also be detected and reported by sensor data 104).

The data may be transmitted to the cloud 116 where cloud operations 108 may be conducted. The container historical data 110, may be used in combination with the internal data 104 and external data 106, received through a cloud data I/O, and an application using data analytics 112 which may include Big Data and shipment information (which may or may not include booking information). The various data components may be fed into the AI engine 114, to produce an AI engine prediction 118 and PTI instruction. This may trigger and send the AI engine prediction 118 to a depot before the actual arrival of the container 102. The AI engine 114 may also provide reefer machinery conditions and detected problems from the previous trip as a PTI report 120.

The PTI report 120 and AI engine prediction 118 may be received by a PTI Vendor 122 who may follow the AI engine recommendations. The benefit to the PTI Vendor 122 of following the AI engine prediction 118 and PTI report 120 is a significant reduction in actual PTI activities done on containers. Test data on over a thousand actual and simulated containers shows a significant decrease in the number of manual PTI needed when following the recommendations of the AI engine prediction 118, and an increased efficiency in handling actual PTI when using the PTI report 120 to manage repairs or maintenance issues related to containers. In some embodiments, carrier 124 may realize an efficiency increase by using the systems and processes described herein. In some embodiments, the efficiency increase may be greater than 25%. In some embodiments, the efficiency increase may be greater than 50%. In some embodiments, the efficiency increase may be greater than 75%. The embodiments described herein may lead to better equipment MNR management and/or greater flexibility of the container movement for triangulation (e.g., routing a near container to a cargo transport opportunity, rather than routing a more distant container for the same task). The shipper 126 may enjoy the benefits of better quality and greater reliability in their containers.

In some embodiments, a shipper, PTI vendor or other party may not receive, or may not have immediate access to the PTI prediction report (such as when a person is not in front of a computer, but actively working in a depot on containers). A user may use a mobile app 128 on a mobile device and look up the PTI prediction report based on the container ID number. A user may use the camera of the mobile device to read the container ID, and may use an OCR (optical character recognition) program to identify the container ID number. Using the mobile app 128, the user may ask the mobile app to provide the PTI prediction status of the container, and can receive the report via their mobile device.

In some embodiments, the system may identify any deviations or disruption from the container and diagnose whether the disruption is a result caused by a normal or abnormal operation event. In the event of an abnormal exception, the system may trigger an alert to the carrier or corresponding cargo owner for an immediate response. In testing, the system reduces about 90% of false alarms, enabling users to maximize their resource allocation and reduce time spent on investigating exceptions.

In some embodiments, the system may project the latest ETA for a container through AI based on real-time locations, historical patterns, vessel ETAs, traffic conditions and road regulations. The system utilizes an AI model that may improve the door arrival time prediction by about 30%. In some embodiments, the prediction may be as high as 40%. This improved door arrival time prediction may help customers shipment delivery status to allow better time management and reliability for shipments to be delivered to consignees.

Figure 2:
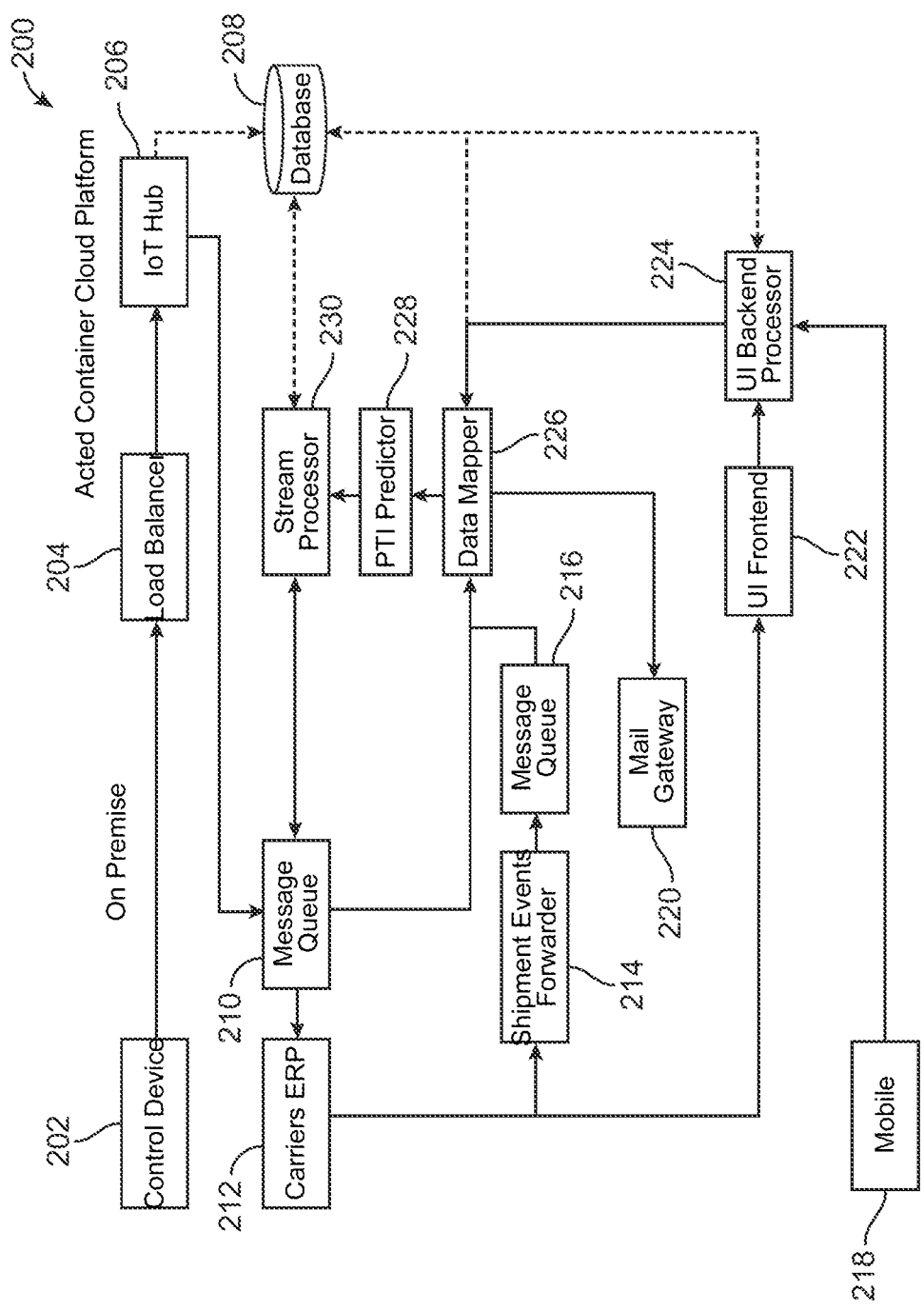
FIG. 2 illustrates a high level overview flowchart 200 in accordance with an embodiment.

A diagram of the process and system elements is now shown (FIG. 2). A container communication device 202 collects the parameters from the container controller and sensors. The container communication device 202 may encrypt the data, and relay the collected data to a cloud platform. The cloud platform may have a load balancer 204 to handle and manage the delivery of the encrypted data from the container communication device 202 to an IoT hub 206, where the signal may be decrypted. Data may be relayed to a database 208. The load balancer 204 may also add more resources to offload the device request loading or redistribute the device request to other IoT hub for resilience purpose. Data may also be sent to a message queue 210. In one non-limiting example, the message queue may be a commercial message service like Solace. Data from the message queue 210 may flow to a stream processor 230, a data mapper 226 and/or a carrier enterprise resource planner (ERP) 212 to manage carrier business processes and resources. If data goes to a stream processor 230, the stream processor 230 may also communicate with a database 208. If the data goes to a data mapper 226 to be pre-processed, the data may be used with the pre-trip inspection (PTI) predictor 228 and a mail gateway 220. The container internet-of-things (CIoT) shipment mapping triggers the PTI prediction, when process GPS data and match on the geofence distance detection. The data mapper 226 may data access object to transfer the data between stream processor and other components. Data from the message queue 210 may also be used in the carrier ERP 212. From the carrier ERP 212, data may flow to a shipment events forwarder 214 and a shipment events forwarder (SEF) message queue 216. The SEF message queue 216 may include lightweight buffer to temporarily stores the Shipment Event messages from 214. The SEF message queue 216, the shipment events forwarder 214 may send the shipment EDI event to the shipment event to CIoT shipment mapping, and trigger a PTI prediction when match empty return event. The data mapper 226 may determine the position of; incomplete shipments, completed shipments, and any other incoming or outgoing containers. The data mapper may then produce a summary and trigger a batch of PTI predictions producing a PTI prediction for each container, and sending the prediction to the mail gateway 220. When shipment event is sent to the data mapper 226, the data mapper 226 may check whether the event is an empty return event. If so, a PTI prediction may be triggered. In some embodiments, the carriers ERP 212 data may also be pushed to the UI frontend 222, and the UI backend processor 224. The UI backend processor may also send and receive data to and from the database 208. Additional information, queries or instructions may be received from a mobile device 218.

Figure 3:
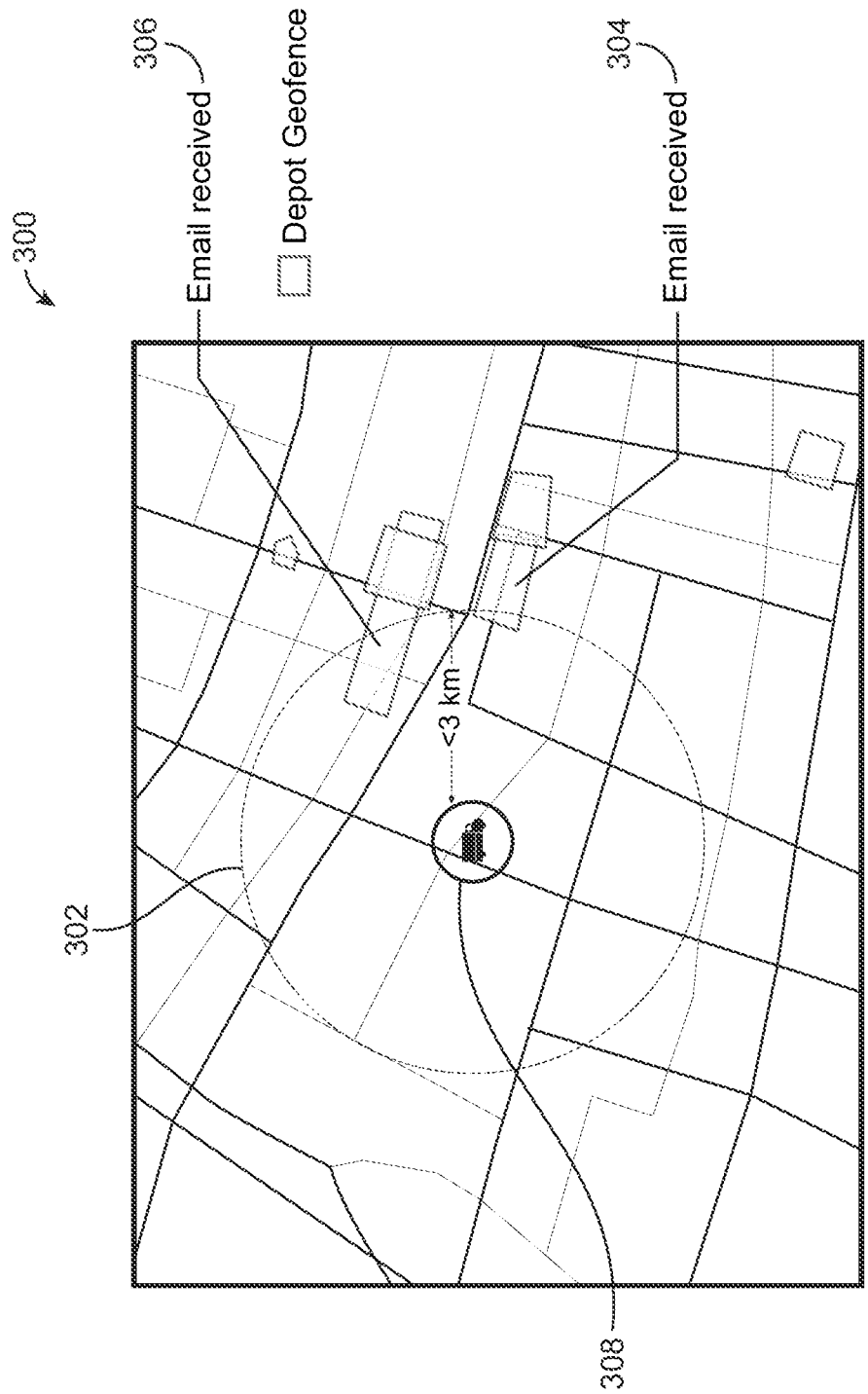
FIG. 3 illustrates a geofence 300 in accordance with an embodiment.

An example of a depot geofence area is now shown (FIG. 3). The area of the geofence 302 of a depot represents the area in which a truck with container 308 may be identified. When the truck with container 308 enters the geofence 302 area, the PTI report may be issued electronically in any convenient format (e.g. email) to any party the system may communicate with. In some embodiments, the system may send a PTI report to a PTI Vendor 304, a carrier, a maintenance or repair facility or other vendor 306 operating in or near the depot. In this manner, the PTI report may be received by the appropriate parties prior to the container 308 arriving. The PTI vendor may direct a carrier with container 308 needing a physical PTI to a particular area of the depot where a PTI may be conducted more efficiently. If no PTI is needed, the container may be unloaded in another area of the depot.

The depot geofence 302 area may be defined by the depot as having a particular radius from its center, within a certain cell of a cellular network, or any other geographic area desired. The geofence 302 of the depot for the purposes of PTI prediction may be expanded or reduced beyond the normal geofence area of the depot, to allow for extra time for receiving PTI reports, or less time.

In some embodiments, the PTI prediction may be available well ahead of the time where a container enters a geofence 302 area. The PTI prediction may be transmitted as soon as its available, or it may be held by the system until the particular container is identified by a particular geofence. In one non-limiting example, a transmission of data from a sensor while the container is in transit may identify something to trigger or justify a physical inspection. This may be a maintenance item, or an alert. The container continues to transmit data to the AI engine, however it may already be determined at an early point in the journey that the container is to undergo a manual PTI review. This may trigger a PTI report for the PTI vendor, allowing the vendor to pre-stock any items identified in the report that may require replacement. In this way, the PTI prediction may help each depot operate more efficiently.

In some embodiments, a PTI report may be triggered by one or more of the container entering the detection range of a depot geofence, a manual request for a PTI prediction report, a latent discharge of the container (e.g., a stuffing or unstuffing event), a gate out or gate in event, or an automated request from the system (e.g., generated by the system, or by a client of the system). In some embodiments, the generation of the PTI report at the time of the unstuffing can help with triangulation (e.g., the coordination of containers to nearest potential bookings) and thus reduce the "down time" of the container. The PTI report may be sent to a truck driver or other carrier, so the driver or carrier may know the container is in suitable condition for a new booking. This may promote efficiency of the container use, which saves money for the container owner while increasing the money earned by the carrier or truck driver. This may also increase the container utilization.

In some embodiments, a container 404 on a transport platform (truck, train, ship or plane) may enter a geofence 402 area and trigger a gateout event 406 (FIG. 4). When the container 404 is in the detection zone 408, a signal from the container 404 may cause the system to generate or send a PTI prediction 410 and send the PTI result 412 to a vendor. The PTI result 412 may be emailed to a vendor computer or device with the system recommendation of what the vendor should do with the particular container 404.

In some embodiments, when a stuffed container leaves a depot, it may generate a gate out event 504 (FIG. 5). The gate out event 504 may trigger the start of the collection of environmental and container data, though in other embodiments, the collection of this data may be continuous to build up, or maintain, a life history for each container. The gate out event 504 may cause an immediate trigger to produce a PTI prediction 506, and send the PTI result 508 to a carrier, PTI vendor, shipper or other party. The PTI trigger 506 may be generated at the gate out event 504, or at some other time while the container may be in the port geofence 502, or shortly after leaving the detection zone of the port geofence 502. When a PTI report is generated, a customer notification may be generated, so the customer may be aware of the container be laden, and of the gate out event 510. In some embodiments, the system may push a notification to the user's mobile device, so the user will receive the notice wherever they are.

Figure 6:
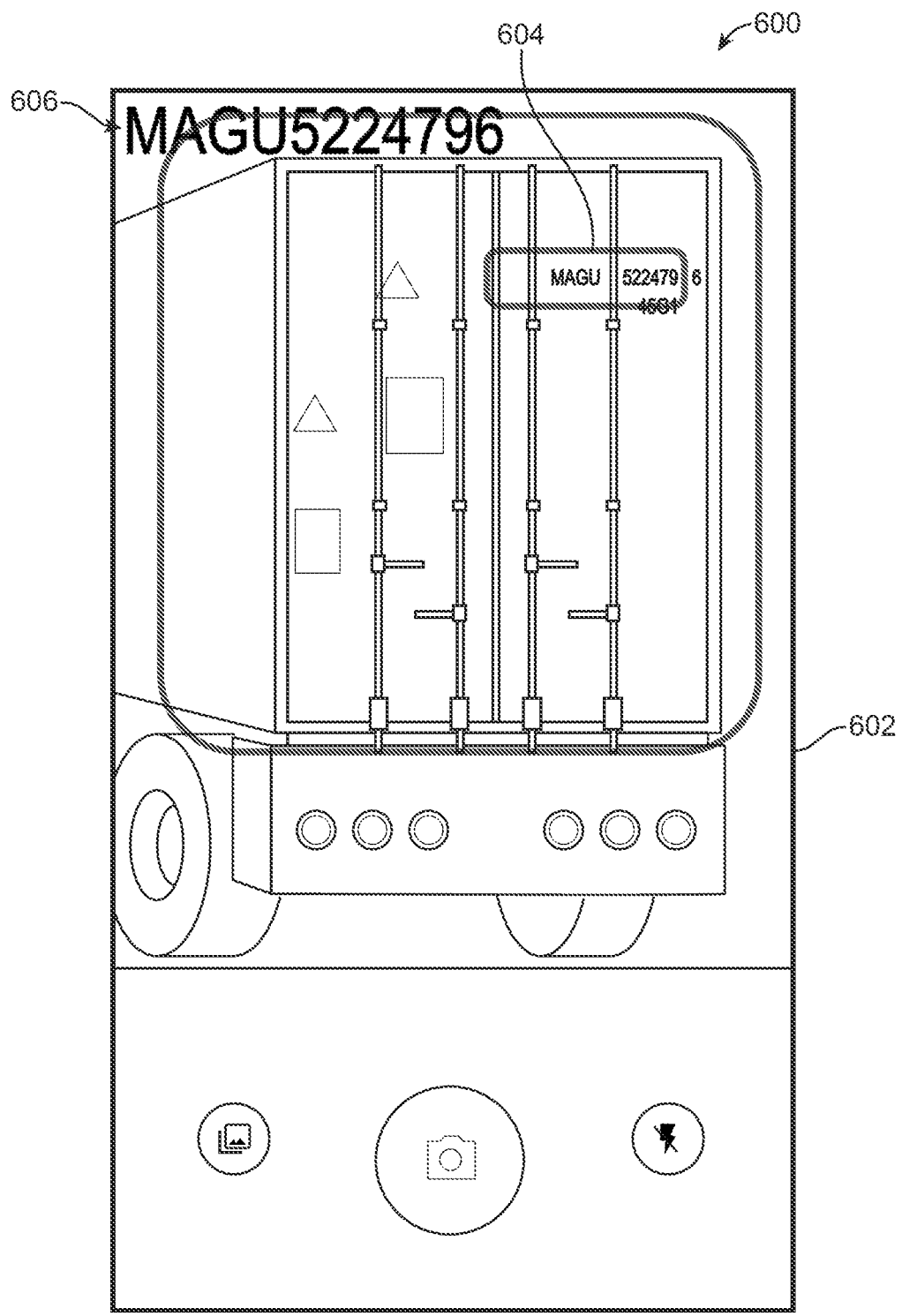
FIG. 6 illustrates an example of using a mobile device for container identification 600 in accordance with an embodiment.
Figure 7:
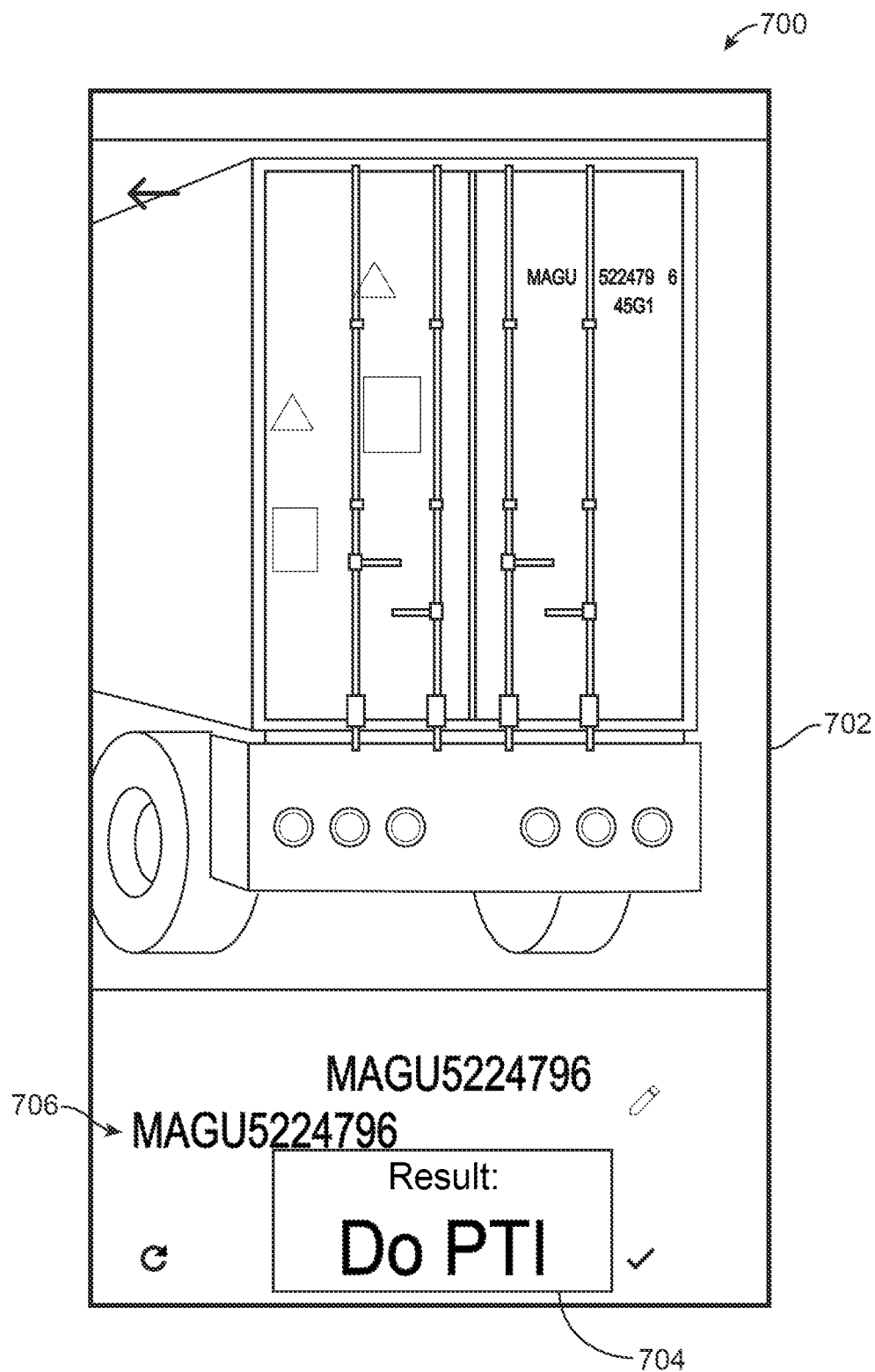
FIG. 7 illustrates an example of a mobile app used for container identification 700 in accordance with an embodiment.

In some embodiments, when a container enters a geofence area, a PTI report may not be sent to the PTI vendor. This may be due to a variety of issues unrelated to the activity of the PTI prediction system. An individual may scan the container ID number and make a manual request for a PTI report (FIG. 6). In some embodiments, a user may use a manual PTI retrieval system 600. The user may have a mobile device 602 and view the container through their mobile device camera. The container ID number 604 is captured in an image, and OCR recognizes ID number 606. The ID number may be uploaded to the cloud to search the database of container IDs. If a match is found, a PTI report may be emailed to the PTI vendor inside the geofence, with a report or report summary may be sent back to the mobile device that made the original inquiry. In some embodiments, the report may be distributed to multiple parties.

In some embodiments, a screen shot 700 shows one non-limiting example of the screen image a user might see on their mobile device 702. The user has the option of accepting or rejecting the container ID 706 he see's on their mobile device. If the user accepts the container ID, the application may send the container number to the system 704 and may get a report back.

Figure 8:
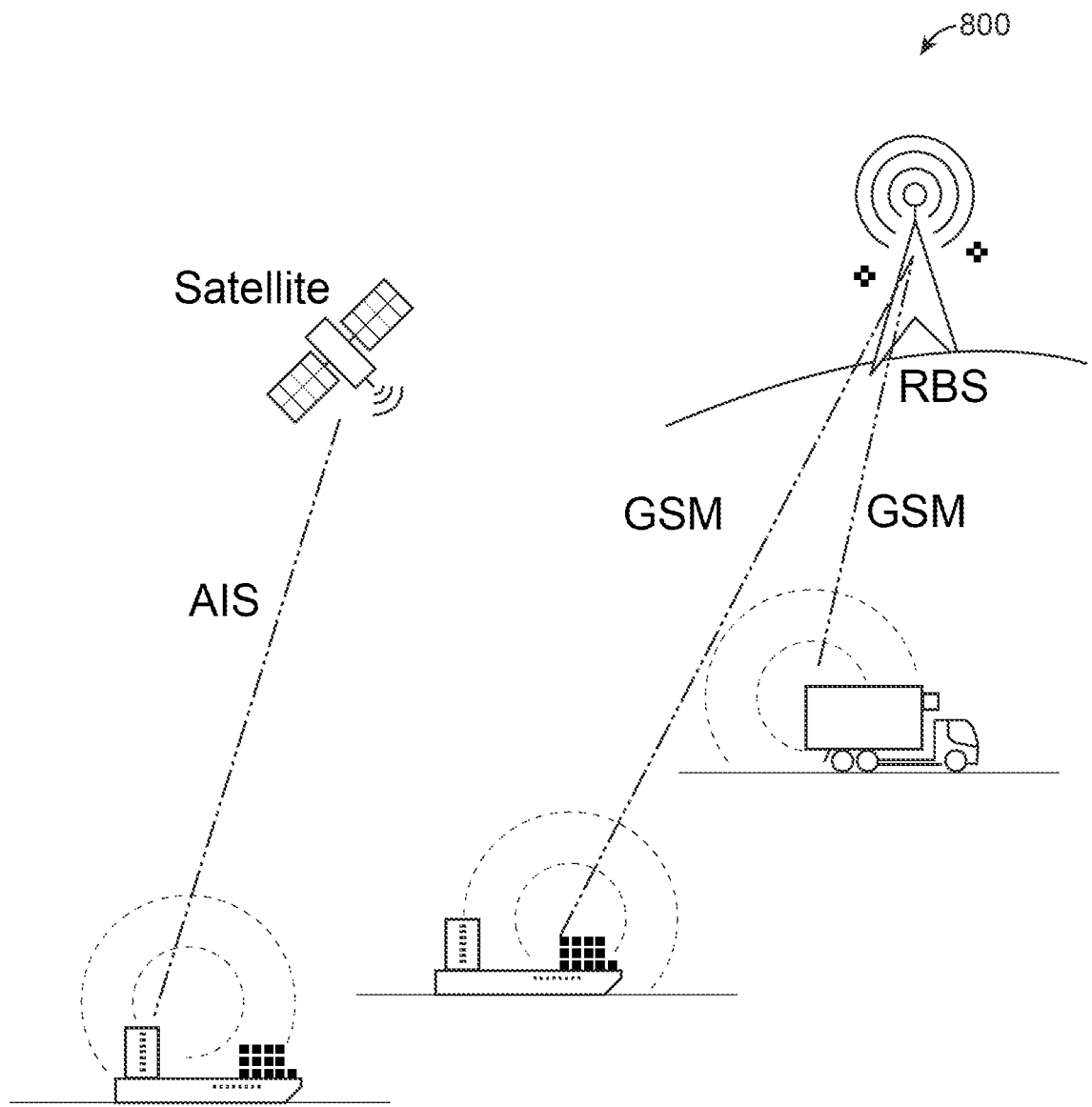
FIG. 8 illustrates several examples of container communication 800 in accordance with several embodiments.

In some embodiments, each container may be tracked while in motion using one or more of a variety of tracking technologies (FIG. 8). In some embodiments, any container capable of wireless communication may be used with the present technical disclosure. Some technologies rely on mobile phones or similar products carried by truck drivers. Others have passive responders that may respond when actively pinged. The general purpose of all these technologies are so shippers and container owners may track the location of their property while they are in the steam of commerce. Devices capable of wireless communication via a cellular protocol, may communicate with cell towers, such as GSM or TDMA networks. Containers that are out of range of a cell network, such as out at sea, may be tracked using a shipboard AIS (automatic identification system). Containers may be associated with a particular ship, and tracked indirectly using the ship's AIS signal, or the AIS data stream may carry additional data about the containers on board a particular vessel.

Figure 9:
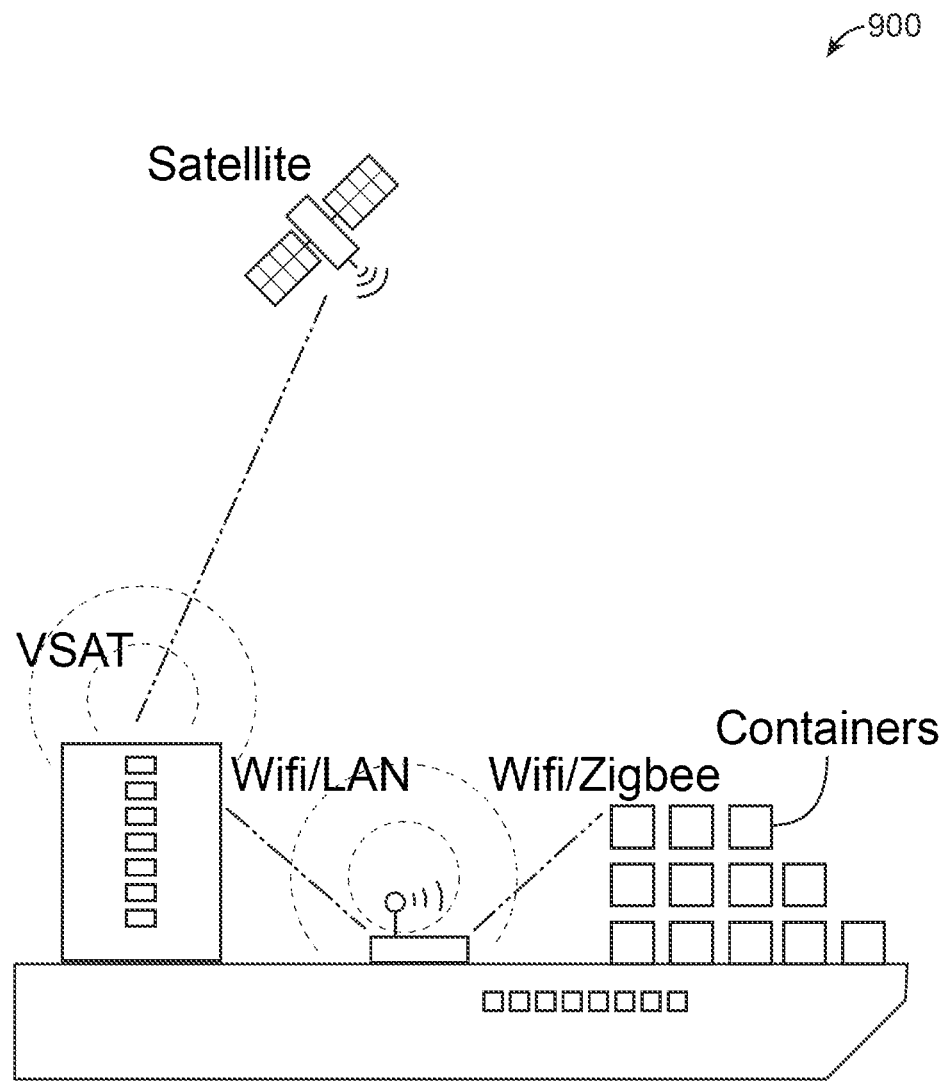
FIG. 9 illustrates a vessel communication network 900 in accordance with an embodiment.

In some other embodiments (FIG. 9), a cargo ship may have a local area network with a wireless set up using Wi-Fi, Zigbee or some other short range local wireless protocol. The individual containers may communicate with the ship board wireless network, and the aggregate signal may be transmitted via satellite to a communication satellite or other communication relay. In some embodiments this communication set up may only provide an uplink, where data is only received by the cloud based server. In some embodiments, the communication may be two way, with the server system able to communicate with one or more containers.

Figure 10:
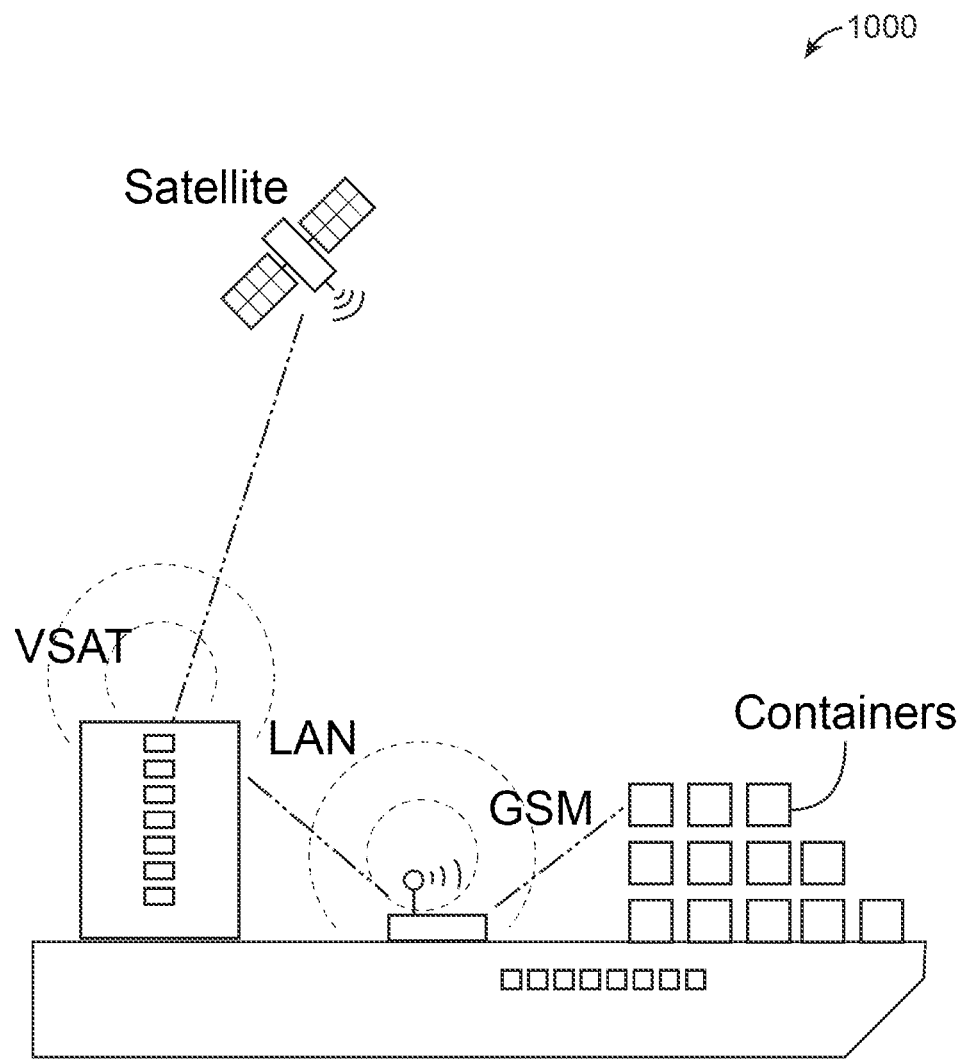
FIG. 10 illustrates another vessel communication network 1000 in accordance with an embodiment.

In some embodiments, the ship may have a GSM/cellular receiver on board, forming a localized cell (FIG. 10).

Figure 11:
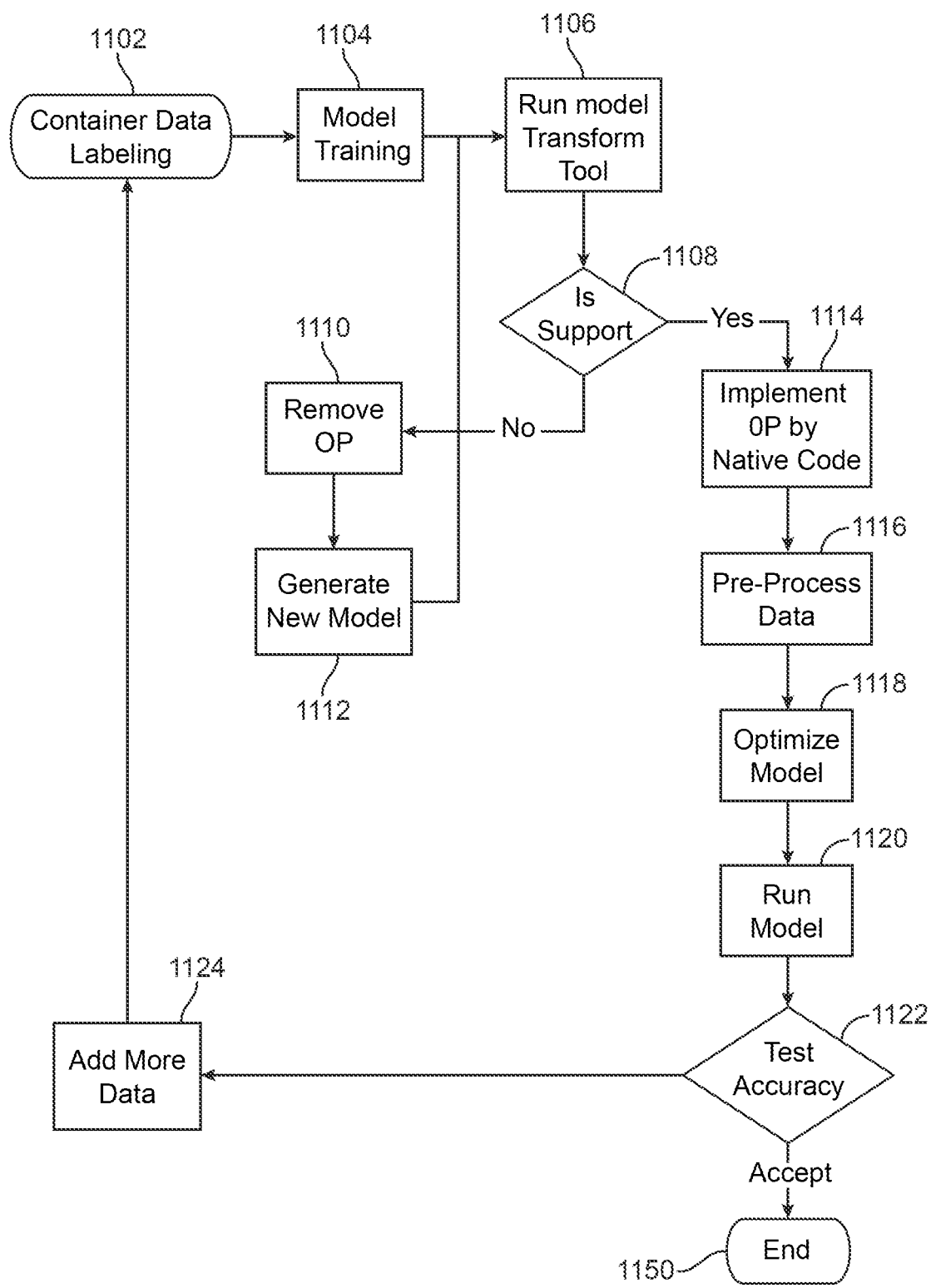
FIG. 11 illustrates a flow diagram of an OCR model Mobile Recognition Flow 1100 in accordance with an embodiment.

An example of training the optical character recognition (OCR) model is now shown (FIG. 11). In some embodiments, a container may have label data that may be captured by a mobile device with a camera. In some embodiments, the container may have a barcode or QR code which may be scanned by a mobile device. The container label data may be passed to a model training algorithm 1104 for training the OCR recognition model. The OCR recognition model may be any type of machine learning model, such as an artificial neural network (ANN), principal component analysis (PCA), Bayes network, clustering algorithm, support vector machines, and regression models, among others. The label data corresponds to a container. Historical data for the identified container may be retrieved from a system database. In some embodiments, the system database may be accessible via the cloud, or it may be accessible through a network computer system.

In some embodiments, the container data label 1102 may be uploaded to the cloud or networked computer system. A model training algorithm may be used to gather historical data from a database. In some embodiments, live data from the container's current route may be used. In some embodiments, the model training algorithm 1104 may generate a model for the creation of a pre-trip inspection prediction report. In some embodiments, the model may not operate on a mobile platform. A model transform tool 1106 may be used to convert the cloud or network computer based model into a model that may run on a mobile device. An evaluation step to determine if the transformed model is supported 1108 on a mobile device may be performed on the transformed model. If the model fails the support analysis, the concept model (OP) that defines an algorithm to do a matrix operation may be removed 1110. A new server side model may be generated 1112, and fed back into the model transform tool.

In some embodiments, the Is Support 1108 operation will produce a viable model that may run on a mobile device (such as a mobile phone, tablet computer, computer tablet, and so on). The mobile device version of the model may implement the concept model OP 1114 using the mobile device native code, mobile applications or emulators. The model may use live data related to the container current transport booking, and pre-process the data 1116, the optimize the model 1118, run the model 1120 and test for accuracy 1122. If the accuracy is insufficient as defined by an internal standard of the program, the mobile device may add more data 1124 to the container data label and repeat the process. If the test accuracy 1122 is acceptable, then the process may end 1150, and the generated PTI prediction may be accepted.

In various embodiments, the use of a model and a transform tool may be used for each container where a PTI prediction may be desired. In some embodiments, the model and transform may be used for each request from a different platform. In some embodiments, where an initial request may come from one mobile device, the model maybe sent to the same mobile device, a different mobile device, or a group of mobile devices.

Figure 13:
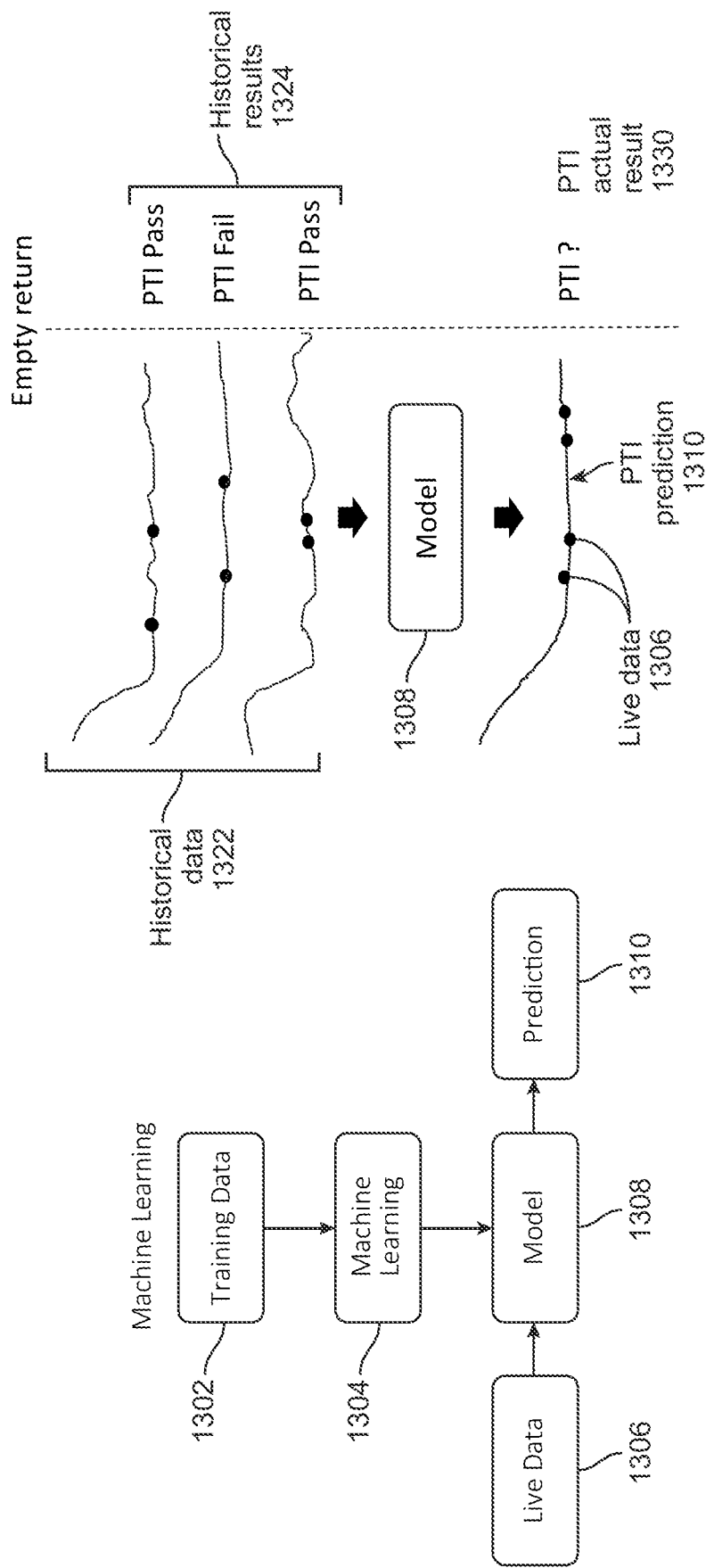
FIG. 13 illustrates a machine learning work flow 1300 in accordance with an embodiment.

In some embodiments, there is a method of modeling suitability of an intermodal container for use (FIG. 13). The method may use a training data sample from a database. The training data sample may represent a preferred operating state for the intermodal container. A machine learning tool may assimilate the training data sample to produce a model parameter for a model. The model parameter may define an acceptable range of data. The model may analyze a live data sample against the model parameter, then predict (using the model) the suitability of the intermodal container for use. The model may determine if the live data sample is within the acceptable range of data.

In some embodiments, the workflow may use historical data 1322 with corresponding known PTI result 1324. The known PTI result 1324 may be presented as a simple binary scale (pass/fail) or a weighted scale depending on other parameters related to the state of a pass or fail that corresponds to the historical data 1322 and the historical result 1324. The cumulative historical data and corresponding historical result may be entered into a AI model 1308. The model may then predict the likelihood of the container having to undergo a manual PTI at its next gate in location.

The model then utilizes live data 1306, to produce a PTI prediction 1310 for the live data. When the container reaches the next gate in location, the container may be placed on a location corresponding to the PTI prediction.

In some embodiments, the PTI prediction 1310 may indicate the container is ready for use. In some embodiments, the PTI prediction 1310 may indicate the container needs a minor and expected repair, update or maintenance (in a non-limiting example, the container may require refueling an onboard electrical generator). In some embodiments the PTI prediction 1330 may indicate the container needs an overhaul, or a major system upgrade, repair or even a complete container replacement. In some embodiments, the PTI prediction 1310 may be verified with a secondary inspection to produce a verified PTI result 1330. The verified PTI result may be added to the historical data for the container, and used for future workflow analysis. In some embodiments, the intermodal container may be a connected container.

In some embodiments, the machine learning tool may use training data 1302. The training data may be hypothetical data produced for a training program, or the training data may be actual historical data 1322. The hypothetical data may provide hypothetical results, and the historical data may use a corresponding number of historical result(s) 1324. In some embodiments, the training data may be present, maintained, or resident on an electric device attached to the intermodal container. In some embodiments, the training data may be accessible via a cloud connection. Collectively these are referred to as training data, and used to train the machine learning algorithm 1304. The machine learning algorithm may produce a model 1308. The model may then take live data 1306, put the live data through the model 1308, and produce a predictive pre-Trip Inspection report 1310.

In some embodiments, the machine learning workflow may be controlled and titrated to handle one set of values at a time. In some embodiments, individual historical data and historical results may be used to determine the individual effectiveness of each data set for determining a PTI prediction model 1308. The individual data points may be analyzed one at a time, in batches, sets or in large groups to provide data analytics for each container. These analytics may be useful to further enhancing or refining the machine learning algorithm 1304 and the model 1308. In some embodiments, the live data 1306 may come from the container. Data may be gathered and processed at any time. In some embodiments, live data may be gathered when the container is idle, in storage, in use or being returned empty. The container may report data during stuffing (loading), unstuffing (unloading), or transit or resting.

In some embodiments, when the system performs analysis of data and generates a model, the system may weight different data from different sensors. The system may note some parameters may be out of a set specification, but may still produce a PTI prediction where the container may not be recommended for any maintenance. In some embodiments, the system may make the opposite determination, and the PTI prediction may recommend a part replacement or repair item though the container may still function normally. In this way, the model may predict when a part, sensor or other component of the container, or the container itself, may be close to failure. The system may note that the container is approaching a geofence area with the appropriate facilities to provide the repair or replacement needed. The system may predict the path of the container, and the various geofences, stuffing and unstuffing stops on a route, and may make an intelligent selection as to where the container may be serviced to minimize down times, and maximize utilization.

In some embodiments, the system may continuously monitor the container, record the data generated by the sensors, and process the information. In some embodiments, the prediction may be based on data from a particular sensor and use data from the particular sensor type from the historical data. In some embodiments, the prediction may be based on similar data from one or more other historical sensors of similar kind (E.G. historical temperature data used to train the model for the evaluation of live temperature data). In still another embodiment, the totality of the data may be used with the totality of the historical data. Put another way, any amount of the historical data from any number of the different sensors may be compiled and evaluated by the engine, so that any particular fault, deviation or failure in the historical data may be averaged out. The historical data may be taken as individual data points, discrete sets of data, or as a whole, using all the data at once. The historical data may be used as training data for the system AI. The live data of the container may be the new data. In some embodiments the machine learning algorithm may use the training data, and input a result to the AI model. The AI model may combine the input result with the new data and produce a new PTI prediction.

In some embodiments, the new PTI prediction may be generated on a continuing bases. It may be that the PTI prediction may be updated each time new data may be received by the system. In some embodiments, the data may be received and stored in a buffer or database until called for by the system. The buffered data may be processed on a clock or cycle schedule. The PTI prediction may be produced as frequently or infrequently as desired.

Figure 14:
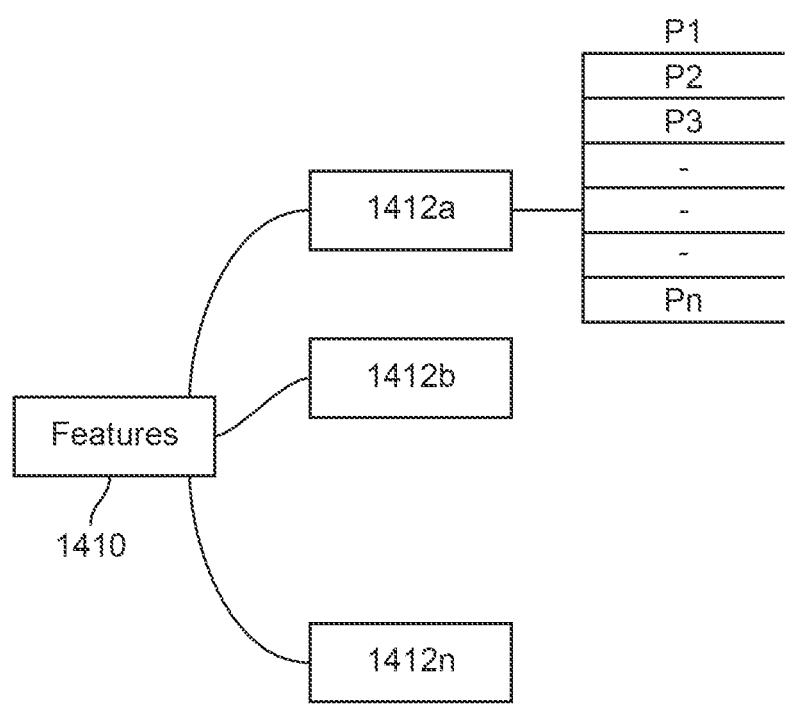
FIG. 14 illustrates an example of PTI model construction 1400 in accordance with an embodiment.

In some embodiments, an AI model may use one or more parameters of the container (FIG. 14). The AI model may have a central feature analysis algorithm (FAA) 1410 to gather data from the many sensors 1412*a-n* of the container. (Note the use of the subscript herein designates a part or piece that has many multiples and may be counted using variable designations a for the first one, and n for the last one, where n is an undefined number.) The AI model may be onboard the container or in the cloud. The container may have a control panel that routes all the sensor 1412 data to the FAA 1410. The container may have a telematics device connected to the container collector to collect the sensory data from the sensor 1412 to the FAA 1410. In some embodiments, a first sensor 1412*a* may represent any sensor of the container. A second sensor 1412*b* may represent another sensor, and so on until each sensor may feed data into the FAA. In some embodiments, a container may have more than 10 sensors. In some embodiments, a container may have more than 20 sensors. In some embodiments, a container may have more than 50 sensors.

In some embodiments, each sensor 1412 may monitor one or more parameters of a particular aspect of the container, container's environmental system or container's contents (cargo). As a nonlimiting example, a temperature sensor may monitor the temperature inside the container. This may be one parameter P1 that the sensor is programmed to report on, However the sensor may also monitor and report other parameters related to the temperature, such as how much power the temperature control unit may be using, whether there are fluctuations in the power supply, the time on or off for the refrigeration unit, the amount of the refrigerant, and so on. All of these parameters P$a$-$n$ may be reported to the sensor, and then passed on to the FAA.

In some embodiments, the FAA may use historical data related to one particular sensor, a set of sensors, or all the sensors of a container in the FAA. The system may then use the corresponding live data from a container in transit to produce a PTI that may relate to an individual system of the container, a set of systems of the container, or the entire container.

In some embodiments, there is a method of producing a pre-trip inspection prediction for a container using a computer. The method evaluates at least one historical data point related to a completed shipment for a container, analyzes an active data point from the container during an active shipment and predicts a likelihood of the container being suitable for a future shipment, according to the evaluation of the at least one historical data point and the analysis of the active data point. The method then produces the pre-trip inspection prediction, using the predicted likelihood of the container being suitable for a future shipment. The predict result can also be used as an instruction to PTI worker whether they are to conduct a manual comprehensive PTI or just a simple PTI, or even skip the PTI. With the AI model enhancement, and this PTI prediction ML, a data driven PTI engine can be built to co-operate or even replace the traditional PTI process In some embodiments, the process of creating the PTI prediction may be an ongoing process. A computer or cloud based computational device may receive active data. Active data is data received from a container when the container may be broadcasting data. In some embodiments, the active data point may be received from the container while the container in use. The container may broadcast data when in use, while in transit from one location to another (full, partially loaded or empty), while waiting for a stuffing or unstuffing, while being repaired or resupplied, and so on. Whenever active data may be received by the computational device, the method may update an event process, and feed the modified data to a PRI prediction algorithm. A new PTI prediction result is generated and provided to a system that logs and tracks the updated results. As the container approaches a geofence, or other area where the container may be inspected, repaired, stuffed or unstuffed, the PTI prediction may be forwarded to parties who may need to know whether or not the container may be suitable to take another booking, or if the container needs to be taken out of service for maintenance.

Figure 15:
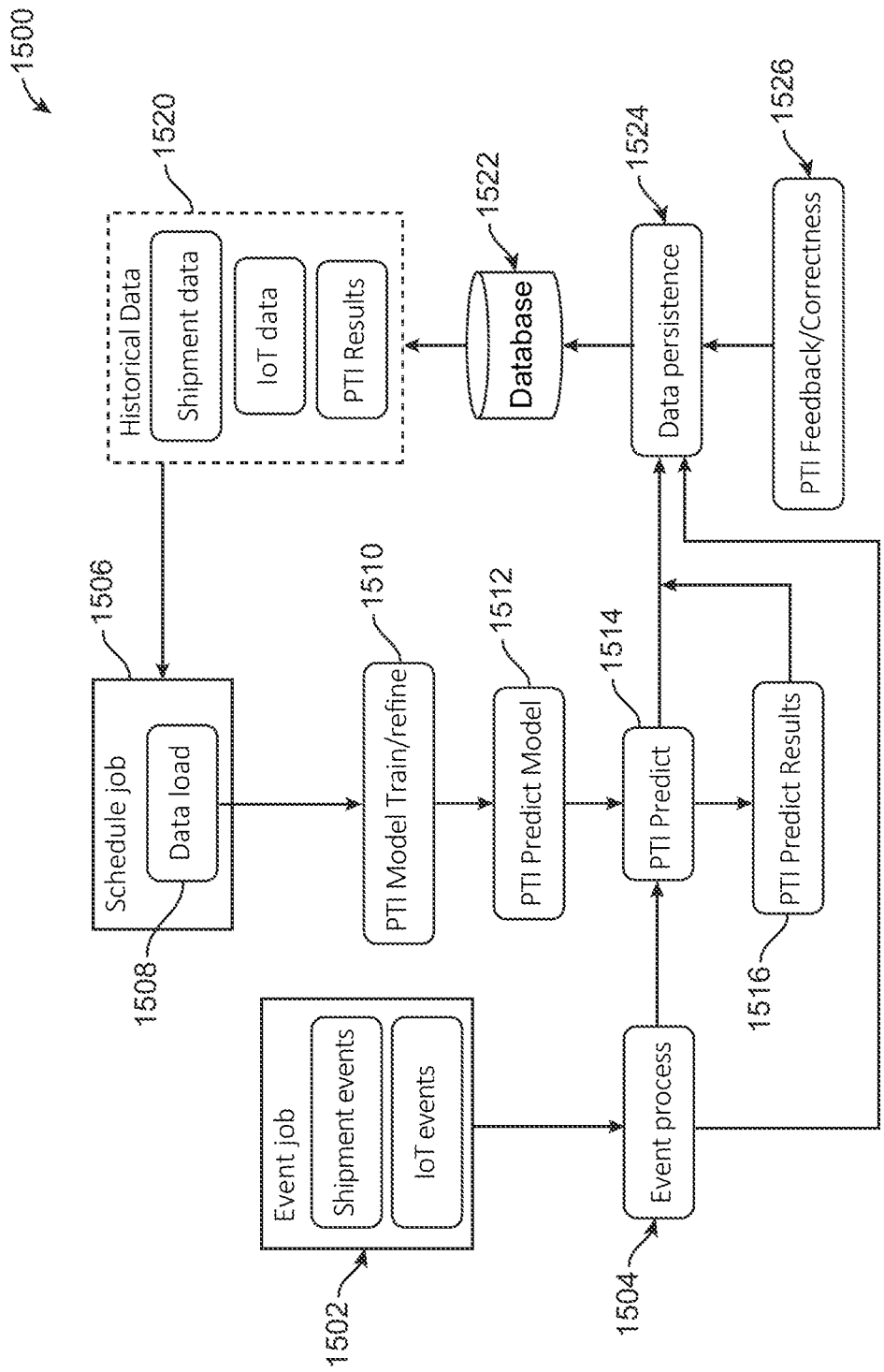
FIG. 15 illustrates a flow chart showing a PTI prediction diagram 1500 in accordance with an embodiment.

In some embodiments, the process of producing a pre-trip inspection prediction result may be seen in FIG. 15. The PTI process 1500 may utilize three components for input information (data). In some embodiments, there may be an event job block 1502 that may provide data about a shipment, shipment events and IoT events. A schedule job block 1506 may provide information relevant to the job being processed. A data load 1508 regarding the job may be provided to in the process. In some embodiments, the data load may contain information related to when the cargo should be picked up, when it should reach certain geofence positions, and when the cargo may be scheduled to arrive at a point of destination. In some embodiments, a historical data block 1520 may provide past information related to previous shipment data, previous IoT data, and previous PTI results. These data, and other data as may be collected and added to the historical data block 1520, may provide predictive values, trends or other information useful to the process to produce more accurate results in each subsequent analysis. In some embodiments, the active data and the pre-trip inspection prediction may be added to a database of historical data points. In some embodiments, the active data and the prediction trip inspection prediction may be continuously updated whenever a new active data point is received by the computer.

Information from the data load 1508 and schedule job block 1506 may be combined with information from the historical data block 1520 in training a PTI model, or refining a PTI model algorithm 1510. The training of the PTI model may use the data from previous trips and cargo in a container, compared to past performances. Correlation using the same data from identical cargo loads, destination and time schedules may be predictive of issues that come up in present or future shipments. In some embodiments, exact data correlation may not be available, so the process may use similar data, drawing from similar types of cargo, similar demands on the container, similar external environmental factors influencing the container, weather, travel routes, carriers, route conditions, and many other variables. In addition to these factors, some embodiments may take into account the wear and tear on the container and its components over time. Data of past upgrades to the container systems, along with life expectancy data of the various components of the container, may be used as part of the algorithm to either train the model 1510, or produce the prediction model 1512. Cargo load may have a variable effect on the wear and tear of the components of the container, and these factors may also be taken into consideration. The algorithm may then provide a weighting to the data and analysis of the date to train the PTI model. When the model training is completed, the algorithm has been modified to produce a PTI prediction model 1512.

The process may use the information from the event job block 1502 in an event process 1504. The event process may determine or calculate IoT event (e.g., a temperature deviation or reefer machinery error code) or shipment events (e.g., arrived port of discharge, terminal-laden gate-out, and empty return), among others. The process may evaluate one or more event job(s) 1502 which may include shipment events and/or IoT events. The event job may be processed through a program that may be specific to the event process, which may use different algorithms for different kinds of shipment events (e.g. shipping avocados vs. shipping vials of insulin). The PTI prediction model 1512 may be used on the result of the event process to produce the PTI prediction result 1516. The PTI prediction result may be used to provide alerts or notifications to parties related to the cargo, either as receivers, shippers, users, investors, and so on. The data from the PTI prediction result may be placed with other data to add to the historical data. Alerts (not shown) may be generated and distributed to various parties as needed if the PTI prediction indicates some maintenance activity may be required on or in the container.

An additional process may be in the form of a reality check, providing PTI feedback and correctness 1526. The feedback and correctness may provide affirmation that the PTI prediction result 1516 was accurate, or inaccurate. If inaccurate, the feedback and correctness 1526 can provide additional data and/or adjustments to the various algorithms to better refine the PTI prediction model 1512, the event process 1504, and the PTI prediction results 1516. The feedback and correctness information may come from the container, a user, a maintenance group or other authorized party to the system.

A schedule job 1506 may have a data load 1508 related to the schedule. The schedule job provides the data load to a process that may be used to train, refine or model a particular PTI program. Historical data 1520 may also be fed into the PTI model training and refinement tool 1510.

Figure 12:
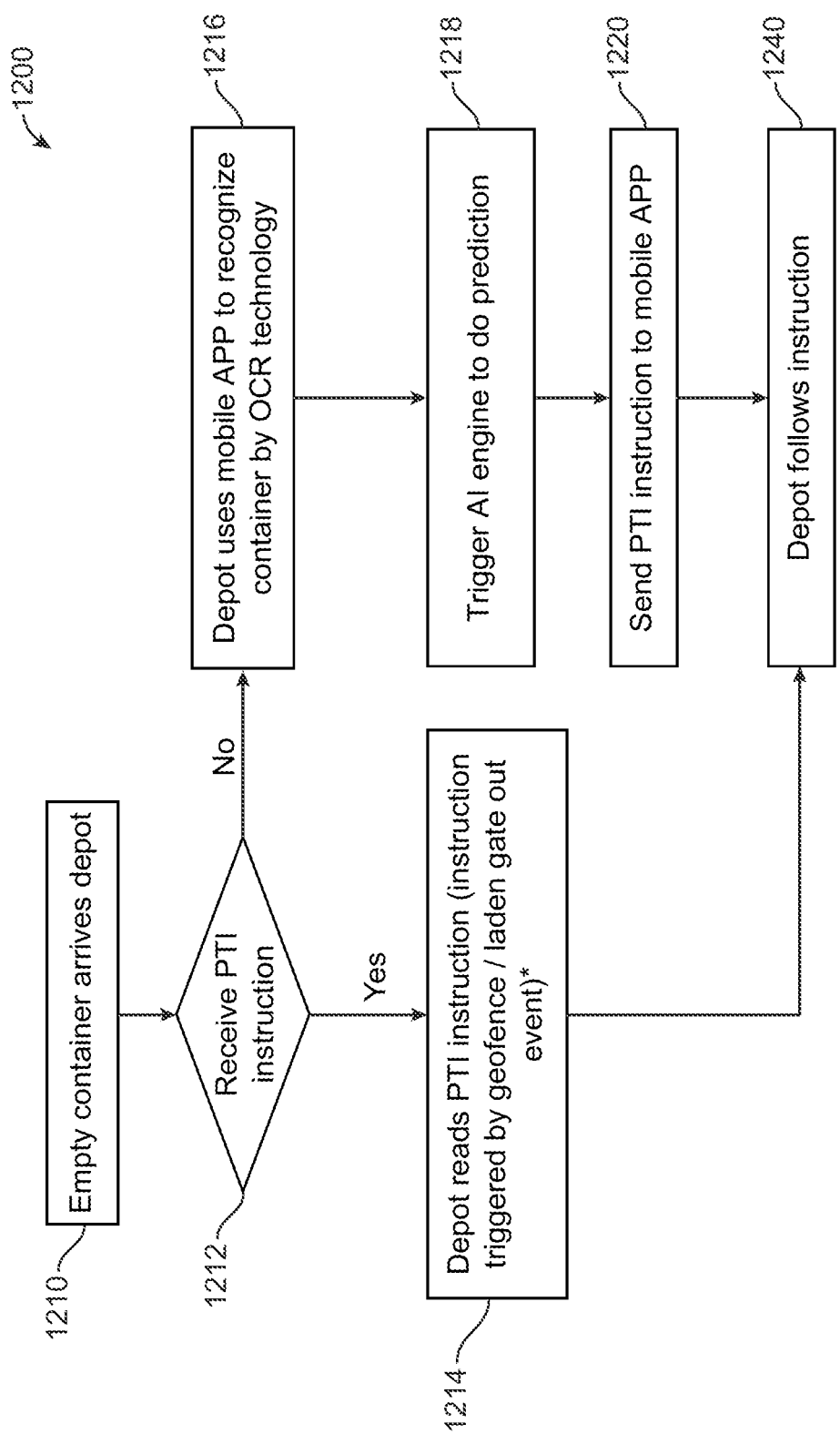
FIG. 12 illustrates an example of a depot obtaining PTI prediction information for a container.

An example of the process flow of the system is now described (FIG. 12). In some embodiments, an empty container may arrive at a geofence depot 1210. The depot may have a PTI prediction for the container, or the PTI prediction may be missing. In some embodiments, a check for the PTI prediction may be done at the gate in of the container, or in a time frame around the gate in of the container. If the depot possesses the PTI prediction for the container, the depot may read the PTI Instructions 1214. In some embodiments the PTI prediction may be triggered by a gate out event, a stuffing or unstuffing event, or a query by a user. The request for the PTI Prediction may come from any suitable source. Once the PTI prediction is received, the depot may carry out the instructions of the PTI prediction 1240.

In some embodiment, the PTI prediction may not be available when the container arrives at the depot (FIG. 12). In some embodiments, the depot may use a mobile app to scan the container ID 1216. The scanning of the container ID may trigger an automated search 1218 for a PTI prediction using the App or the system accessed by the mobile app. The system may then send the PTI prediction for the appropriate container to the depot. The notification may come through an email, or directly to the mobile device that triggered the automated search 1220. Once the depot has received the PTI prediction, the depot may carry out the instructions 1240.

In some embodiments, an example screen shot is shown (FIG. 16). A user may track containers using the container ID number in the left hand column. The data shows each containers last booking number, and whether a PTI was recommended or not. A time code shows when the data was last updated, as well as when the container made its most recent empty return. If a PTI was indicated, there is a column which provides explanation for the PTI.

In some embodiments, an expanded view of the feedback window is shown. Here a may provide or view information related to the PTI recommendation for the container.

In some embodiments, an AI enabled PTI optimization engine may reduce a customer's PTI costs by about 70%. In some embodiments, the built-in PTI mis-claim report for cost recovery may experience a 90% reduction in workload. In some embodiments, the built-in remote customer import compliance report may be substantially reduced as well, as well as saving on data download costs. Empirical data shows this system can improve EDI accuracy and reduce the work for a defined geofence detection zone.

A user interface (UI) for computers and a mobile app may be made available to users such as cargo owners. The system may identify potential cargo quality impacts, detect violations of security compliance, predict last mile ETA to facilitate logistic planning, and make us of AI enabled smart alerts to reduce critical disruptions.

Figure 17:
FIG. 17 illustrates a screen shot of a user feedback function in the UI 1700 in accordance with an embodiment.

In some embodiments, the computer or mobile application programs may have a user input field (FIG. 17) for users to provide direct feedback to the system. The user feedback may include information about the PTI prediction being accurate or inaccurate, and leave any comments for the system. The data entered by a user may be used to enhance the machine learning algorithm.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer program instructions, encoded on one or more computer storage medium for execution by, or to control the operation of, data processing apparatus, such as a processing circuit. A controller or processing circuit such as CPU may comprise any digital and/or analog circuit components configured to perform the functions described herein, such as a microprocessor, microcontroller, application-specific integrated circuit, programmable logic, etc. Alternatively or in addition, the program instructions may be encoded on an artificially generated propagated signal, e.g., a machine-generated electrical, optical, or electromagnetic signal, that is generated to encode information for transmission to suitable receiver apparatus for execution by a data processing apparatus.

A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate components or media (e.g., multiple CDs, disks, or other storage devices). Accordingly, the computer storage medium is both tangible and non-transitory.

The operations described in this specification may be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing The apparatus may include special purpose logic circuitry, e.g., an FPGA (field programmable gate array) or an ASIC (application specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, OLED (organic light emitting diode) monitor or other form of display for displaying information to the user and a keyboard and/or a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

While this specification contains many specific embodiment details, these should not be construed as limitations on the scope of any embodiments or of what may be claimed, but rather as descriptions of features specific to particular embodiments. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Having described certain embodiments of the methods and systems, it will now become apparent to one of skill in the art that other embodiments incorporating the concepts may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed is:

1. A method of producing pre-trip inspection predictions for containers, the method comprising:
   retrieving, by one or more processors, at least one first historical data point related to a completed shipment for a first container;
   receiving, by the one or more processors, a first active data point from the first container during active shipment of the first container;
   determining, by the one or more processors, a likelihood of the first container being suitable for a future shipment, by applying a machine learning (ML) model to the at least one historical data point and the first active data point, the machine learning model trained using data including a second historical data point related to a completed shipment for a second container, a second active data point from a second container during active shipment, and a result of a subsequent shipment of the second container; and
   producing, by the one or more processors, the pre-trip inspection prediction, using the likelihood of the first container being suitable for the future shipment.

2. The method according to claim 1, wherein the at least one historical data point further comprises a plurality of data elements from one or more completed shipments.

3. The method according to claim 1, wherein the first active data point is received from one or more sensors on the first container while the first container is in transit.

4. The method of claim 1, wherein the first active data point is evaluated through an event process.

5. The method according to claim 1, wherein the one or more historical data point(s) further comprises at least one pre-trip inspection result.

6. The method according to claim 1, wherein the historical data point and the active data point are from the same container.

7. The method of claim 1, wherein the active data point and the pre-trip inspection prediction are added to a database of historical data points.

8. The method of claim 7, wherein the active data and the pre-trip inspection prediction are continuously updated whenever a new active data point is received.

9. A method of modeling suitability of intermodal containers for use, the method comprising:
   accessing, by one or more processors from a database, a training data sample identifying a preferred operating state for a first intermodal container;
   training, by the one or more processors using a machine learning tool, a model using the training data sample to produce a model parameter for the model, the model parameter defining an acceptable range of data;
   comparing, by the one or more processors using the trained model, a live data sample received from a sensor on a second intermodal container against the model parameter; and
   determining, by the one or more processors via the model, the suitability of the second intermodal container for use, according to whether the live data sample is within the acceptable range of data defined by the model parameter.

10. The method of claim 9, wherein the training data sample further comprises a historical record of a previously recorded live data sample, and a historical record of a previously recorded pre-trip inspection prediction result.

11. The method of claim 9, where the second intermodal container is a connected container.

12. The method of claim 9, wherein the training data sample is resident on an electronic device attached to the first intermodal container.

13. The method of claim 9, wherein the training data sample is accessible via a cloud connection.

* * * * *